(12) United States Patent
Yen et al.

(10) Patent No.: US 8,774,257 B2
(45) Date of Patent: Jul. 8, 2014

(54) APPARATUS AND METHOD OF CONTROLLING DRIVING CURRENT OF TRANSMISSION

(75) Inventors: Kuang-Yu Yen, Hsinchu County (TW); Chih-Hung Tsai, Kao-Hsiung Hsien (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 525 days.

(21) Appl. No.: 13/027,223

(22) Filed: Feb. 14, 2011

(65) Prior Publication Data

US 2011/0211626 A1 Sep. 1, 2011

(30) Foreign Application Priority Data

Feb. 26, 2010 (TW) .............................. 99105644 A

(51) Int. Cl.
*H04B 17/00* (2006.01)
(52) U.S. Cl.
USPC .......................................... 375/224; 375/228

(58) Field of Classification Search
USPC .................................................. 375/224, 228
See application file for complete search history.

(56) References Cited

U.S. PATENT DOCUMENTS

| 5,438,699 | A | * | 8/1995 | Coveley ..................... 455/67.14 |
| 7,082,107 | B1 | | 7/2006 | Arvelo |
| 2003/0101015 | A1 | * | 5/2003 | Douskey et al. .............. 702/120 |
| 2006/0047617 | A1 | * | 3/2006 | Bacioiu et al. ................ 706/59 |
| 2009/0147820 | A1 | * | 6/2009 | Fishman et al. .................. 374/1 |

* cited by examiner

*Primary Examiner* — Michael Neff
(74) *Attorney, Agent, or Firm* — Winston Hsu; Scott Margo

(57) ABSTRACT

A method of tuning a driving current of a data transmission interface includes: utilizing a driving current with a present current value to continuously send a test data to a receiving end; accumulating a number of times that the test data is sent to generate a transmission counting result; determining whether a transmission error occurs while the test data is sent to the receiving end and accumulating a number of times that the transmission error occurs to generate a transmission error counting result; and when the transmission counting result reaches a predetermined value, determining how to tune the present current value of the driving current according to the transmission error counting result.

16 Claims, 3 Drawing Sheets

APPARATUS AND METHOD OF CONTROLLING DRIVING CURRENT OF TRANSMISSION

BACKGROUND

1. Technical Field

The disclosure relates to data transmission.

2. Description of the Prior Art

A data transmission interface standard usually indicates the physical layer characteristic regarding signals (e.g. voltage, current and clock) in the specification. Thus, hardware designers and manufacturers design and manufacture products according to the specification of the data transmission interface standard. For ensuring the reliability and stability of data transmission, the hardware designers and manufacturers generally increase the intensity of a signal (e.g. a higher current value), thereby reducing the possibility of transmission errors. Additionally, in the specification, it is usually requested that the current value of the signal at the transmitting end be greater than a level (which usually varies with different standards) in order to ensure the exactness of data transmission over a certain transmission distance.

However, in some functional modules (e.g. Bluetooth transceiving modules, wireless transmission modules or DTV modules) in portable electronic devices (e.g. laptops), the greater intensity of signals may unnecessarily cause excess power consumption. Alternatively, the practical distance over which a signal is transmitted is much shorter than that defined in the specification, and thus the signal attenuation is not critical, causing a transmission error. Thus, if the signal is transmitted with the physical layer characteristic defined in the specification, it also unnecessarily causes power consumption. There are apparently many shortcomings in the conventional art to be overcome.

SUMMARY

With this in mind, the disclosure provides a driving current tuning mechanism, which is based on the exactness of data transmission, utilized for a data transmission interface of peripherals. For determining a most proper driving current, in exemplary embodiments, the transmission test is performed with a test data, and then the exactness of test data transmission can be observed, thereby determining to either increase or decrease a current value of the driving current. In this way, under the condition that the exactness of data transmission is finely maintained, the driving current can still be tuned to save the power consumption.

According to one exemplary embodiment, a method of tuning a driving current of a data transmission interface is provided. The method comprises: utilizing a driving current having a present current value to continuously send a test data from the data transmission interface to a receiving end; accumulating a number of times that the test data is sent to generate a transmission counting result; determining whether a transmission error occurs while the test data is sent to the receiving end and accumulating a number of times that the transmission error occurs to generate a transmission error counting result; and when the transmission counting result reaches a predetermined value, determining how to tune the present current value of the driving current according to the transmission error counting result.

According to another exemplary embodiment, a driving apparatus is provided. The driving apparatus comprises: a driving circuit, a control unit and a transmission error counting unit. The driving circuit is utilized for providing a driving current having a present current value in order to continuously send a test data from a data transmission interface to a receiving end. The control unit is utilized for determining whether a transmission error occurs while the test data is sent to the receiving end. The transmission counting unit is coupled to the control unit, and utilized for accumulating a number of times that the transmission error occurs to generate a transmission error counting result according to the determination of the control unit. When a transmission counting result corresponding to a number of times that the test data is sent reaches a predetermined value, the control unit determines how to tune the present current value of the driving current according to the transmission error counting result.

These and other objectives of the disclosure will no doubt become obvious to those of ordinary skill in the art after reading the following detailed description of the embodiment that is illustrated in the various figures and drawings.

DETAILED DESCRIPTION

Several exemplary embodiments will be described for explaining claimed features of the disclosure in the following; these are for illustrative purposes rather than for restrictive ones.

Figure 1:
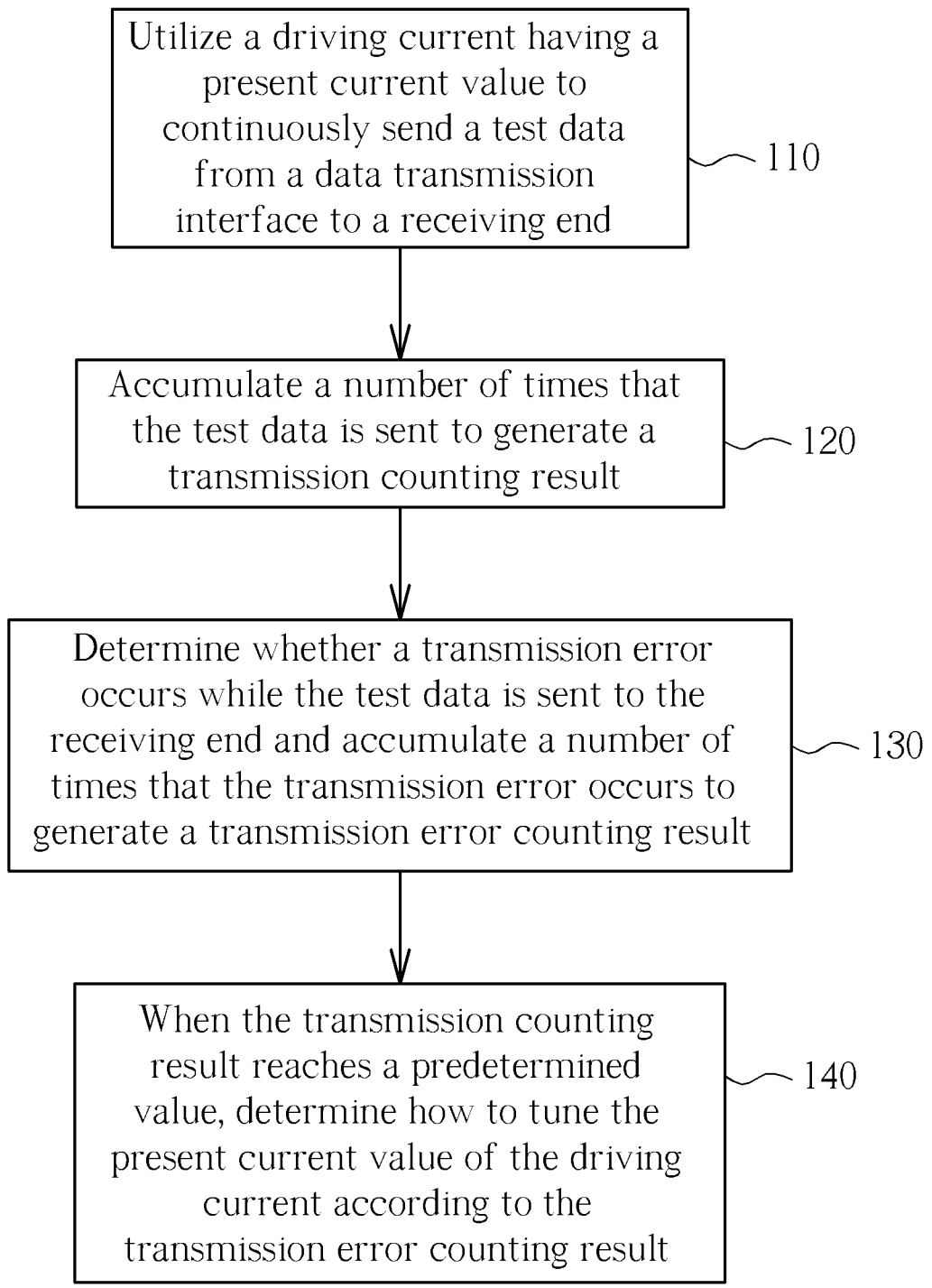
FIG. 1 is a flow chart according to one exemplary embodiment.

Please refer to FIG. 1, which illustrates a flow chart according to one exemplary embodiment. This flow includes the following steps:

Step 110: Utilize a driving current having a present current value to continuously send a test data from a data transmission interface to a receiving end;

Step 120: Accumulate a number of times that the test data is sent to generate a transmission counting result;

step 130: Determine whether a transmission error occurs while the test data is sent to the receiving end and accumulate a number of times that the transmission error occurs to generate a transmission error counting result; and Step 140: When the transmission counting result reaches a predetermined value, determine how to tune the present current value of the driving current according to the transmission error counting result.

Firstly, in Step 100, the test data (which may be any already-known data, for purposes of testing/training) is continuously sent to the receiving end by utilizing the driving current having the present current value. Please note that, each time, the content of test data to be sent may not be necessarily identical, and just needs to be already-known. Accordingly, the following steps record the number of times and the frequency that the transmission error occurs to determine whether the present current value that is currently utilized is able to ensure the exactness of data transmission. That is, in Step 120, the number of times that the test data is sent is accumulated in order to generate a transmission counting result. In other words, in this exemplary embodiment, each time the test is sent from the data transmission interface to the receiving end, the transmission counting result will be increased by 1. Via counting successively, the transmission counting result can be derived. Then, in Step 130, it is determined whether a transmission error occurs while the test data is sent to the receiving end, and a number of times that the transmission error occurs to generate a transmission error counting result is accumulated. Wherein, the transmission error is found or determined according to whether the receiving end sends a retransmission request. Finally, in Step 140, once the transmission counting result reaches a predetermined value, in accordance with the transmission error counting result, it will be determined how to tune the present current value of the driving current.

In one exemplary embodiment, the step of determining how to tune the present current value of the driving current comprises: comparing the transmission error counting result with a threshold value; decreasing the present current value if the transmission error counting result is smaller than the threshold value; and increasing the present current value if the transmission error counting result is greater than the threshold value. In other words, if the method comprehends that the exactness of data transmission is affected by the decreased driving current, the present current value will be increased soon afterwards. If the exactness of data transmission is still in a reliable range, the present current value of the driving current will be continuously decreased till a minimum current value that is able to correctly send data is found. In addition, once the present current value is tuned, the transmission counting result and the transmission error counting result will be accordingly reset. In order for comprehending whether the tuned present current value of the driving current is still able to ensure the exactness of data transmission, the flow of tuning the driving current of the data transmission interface will be executed again. In exemplary embodiments, the threshold value is determined depending on the tolerance of transmissions errors defining the specification of the data transmission interface standard. Specifically, assume the tolerance of transmissions errors defining the specification of the data transmission interface standard defines that if transmission error occurs beyond a specific value during a period of time, the connection of the data transmission interface will be forcedly disconnected. In this regard, the threshold value of the disclosure will be selected as a value smaller than the specific value defining the specification of the data transmission interface standard to prevent an excessively-decreased current value from causing too many transmission errors, leading to a forced disconnection while the present current value is almost equal to a minimum current value that can correctly send data.

Moreover, if the driving current is tuned to be very low, successively sending too much test data may also lead to the transmission error frequently occurring, and then the data the connection of the data transmission interface may be forcedly disconnected. To avoid such a condition, in one exemplary embodiment of the disclosure, the test data is inserted into the transmission of normal data. For example, assuming that the test data and the normal data are in the form of packets, the disclosure may insert one test packet into a successive string of 5 normal packets to prevent forced disconnection. Such an arrangement of normal data and test data is for illustrative purposes only, and not a limitation of the disclosure. In fact, the number of normal data does not affect the tuning of the driving current since the method of the disclosure merely observes the transmission error regarding the test data rather than the transmission error regarding the normal data. Additionally, the normal data is sent by the driving current whose exactness of data transmission has been ensured; that is, the driving current has been tuned according to the transmission error counting result. As a result, a situation where the current value that has not been ensured for exactness/reliable is utilized for sending normal data can be avoided. In other words, the flow of tuning the driving current does not affect the exactness of data transmission of normal data.

Moreover, in Step 110, the receiving end sends a request message to the data transmission interface, and the data transmission interface receives the request message and sends the test data to the receiving end. In other words, the transmission of the test data is processed based upon the request message. Additionally, in Step 130, when a transmission error occurs while the test data is sent to the receiving end, the operation of retransmitting the test data is also based upon the request message. That is, if after the test data is sent to the receiving end from the data transmission interface, the data transmission interface immediately receives another identical request message (i.e., retransmission request), it can be determined that the transmission error occurs while the test data is sent to the receiving end. In other words, the disclosure utilizes the fact of whether two request messages are continuously received to determine whether the transmission error occurs.

Figure 2:
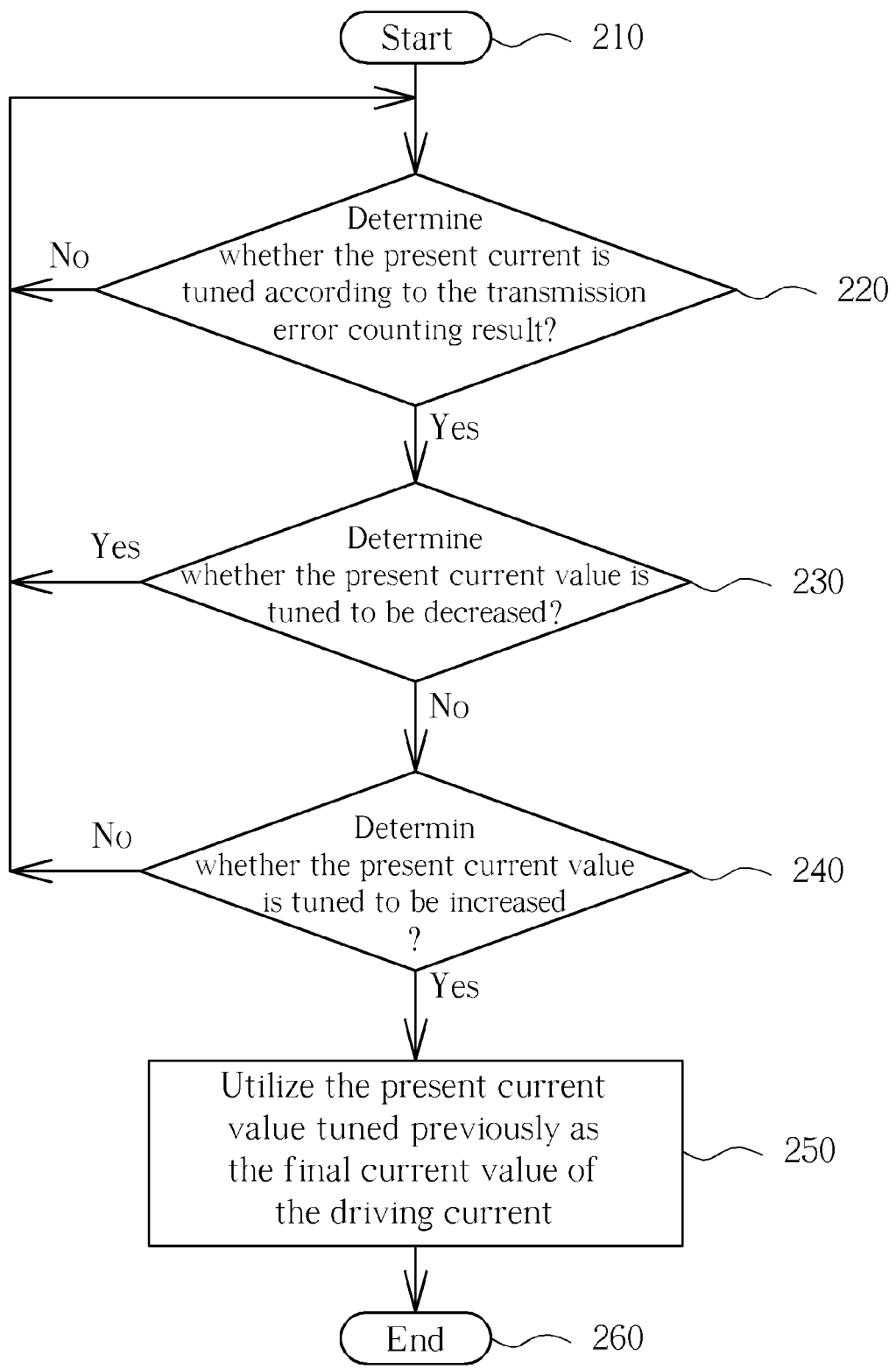
FIG. 2 is a flow chart showing when to finish the tuning of the driving current according to one exemplary embodiment.

In one exemplary embodiment, in order to determine a final value of the driving current, the tuning of the driving current will be finished under certain conditions. Depending on how the present current value is initially configured, the tuning of the driving current is determined to be finished: for example, if the present current value is initially configured as a maximum value defined in the specification of the data transmission interface standard. That is, the present current value will be gradually decreased in the following operations of the tuning of the driving current. Under this condition, once a certain operation of the driving current tuning determines that the present current value needs to be increased according to the number of times that the transmission errors occurs (namely, the number of times is beyond the threshold value), it means that the present current value is too low to ensure the exactness of data transmission and cannot be decreased any more. Thus, the present current value will be increased, and the increased present current value will be utilized as the final current value of the driving current, and the tuning of the driving current will be finished. Afterwards, the data transmission interface utilizes the driving current having this final current value to perform normal data transmission (that is, no more test data is sent). For putting the concept of the disclosure in a more clear way, the above-mentioned operation is summarized as Steps 210-260 of a flow chart show in FIG. 2. With reference to FIG. 2, in Step 220, the flow determines whether the present current is tuned as the transmission error occurs too frequently (namely, the number of times that the transmission error occurs is beyond the threshold value); if yes, the flow goes to Step 230 and otherwise, the flow stops at Step 220, which waits for the present current value to be tuned. In Step 230, when the present current value is tuned, it is determined whether the tuning is to decrease the present current value. If the tuning is to decrease the present current value, the flow goes to Step 220; otherwise, the flow goes to Step 240, which determines whether the tuning is to increase the present current value. In the step 240, if the tuning is not to increase the present current value, the flow goes to Step 220. If the tuning is indeed to increase the present current value, the flow goes to Step 250, which utilizes the increased present current value as the final current value, and the tuning of the driving current is finished.

For example, assuming that an initial configuration of the present current value of the driving current is 50 mA, and the present current value is 30 mA, this means that the flow passes through Steps 220 and 230. Accordingly, the flow goes to Step 220 to wait for a next tuning occurring. If the next tuning occurs, and the present current value is increased to 35 mA, the flow of tuning the present current value will be finished, and the present current value of 35 mA will be utilized as a final current value of the driving current. That is, all the normal data (packets) will be sent by the driving current of 35 mA. Similarly, assume the present current value is initially configured as a minimum value defined in the specification of the data transmission interface standard. The tuning of the present current value will be performed in an inversed way compared to the foregoing description. In this way, once the present current value is decreased, the tuning of the present current value is finished, and the decreased current value will be utilized as a final current value of the driving current. It should be noted that, if the present current value is initially configured as an excessively low value, a forced disconnection may possibly occur. Thus, the initial current value must be properly configured, which may be accomplished according to the specification of the data transmission interface standard or experimental data. These alternative implementations (i.e., configuring the initial current value as a low value rather than a high value) also can accomplish the objective of finding the minimum driving current that can correctly send data, which also falls within the scope of the disclosure.

When the method is applied to a Universal Serial Bus (USB) interface standard, the request message may be an IN token packet defined in the specification of the USB standard and the receiving end may be an USB host. The USB host utilizes the IN token packet to activate the method. That is, when the USB host sends the IN token packet, the method starts to send test data from the data transmission interface.

Figure 3:
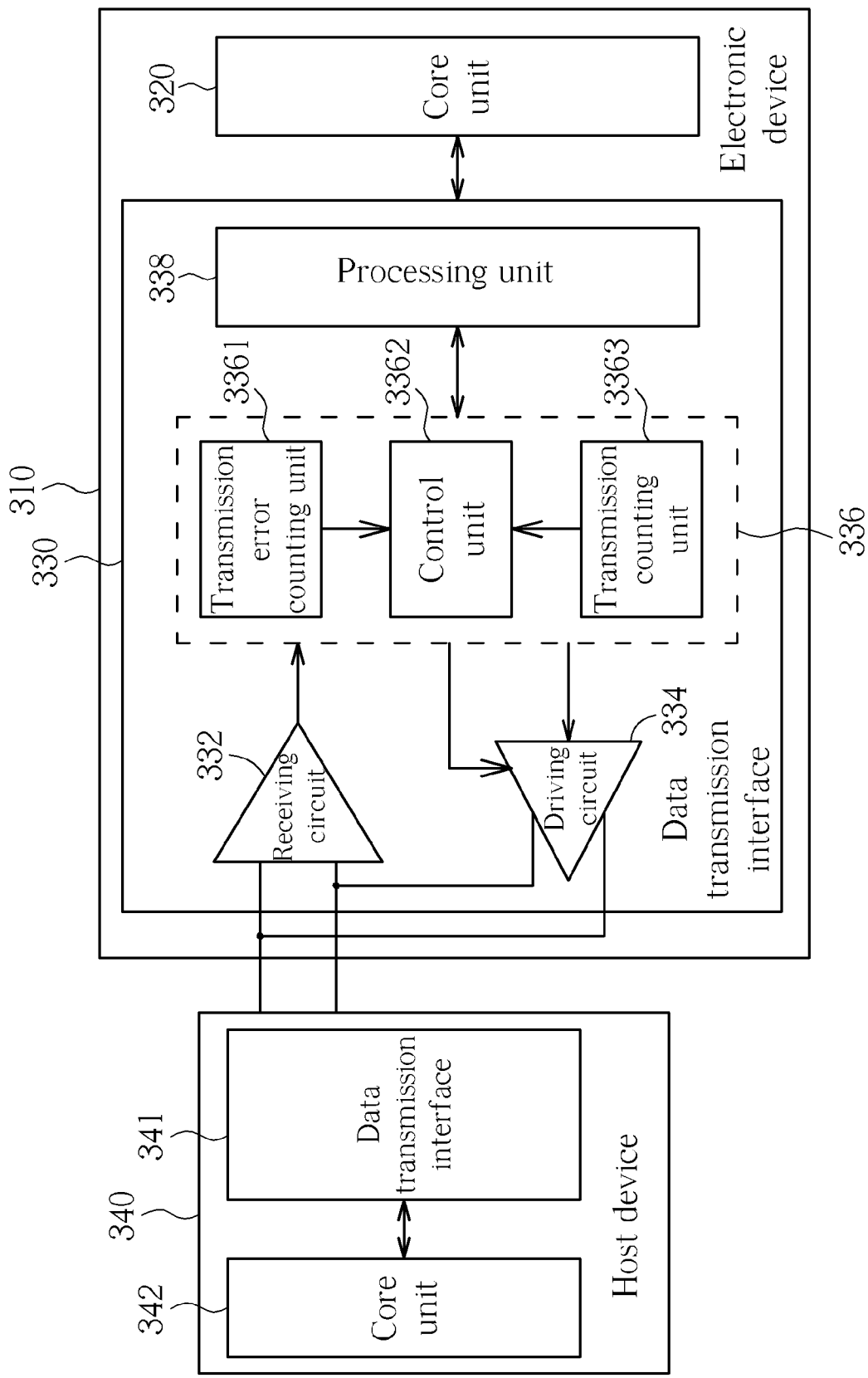
FIG. 3 is an application block diagram of a driving apparatus according to one exemplary embodiment.

With the method, the disclosure further provides a driving apparatus for controlling a driving current of a data transmission interface. In the following, an electronic device comprising the driving apparatus and the data transmission interface, and a host device coupled to the electronic device will be utilized for explaining the concept of the disclosure. As shown in FIG. 3, a data transmission interface 330 is utilized for providing a data transmission path for an electronic device 310, and interfacing the data transmission interface 330 with a host device 340. The electronic device 310 and the host device 340 perform data transmission according to an identical data transmission standard. The electronic device 310 may be a Bluetooth transceiving module or a wireless transmission module. If the electronic device 310 and the host device 340 perform data transmission according to USB standard, the host device may be a USB hub.

As shown in FIG. 3, the electronic apparatus includes a core unit 320 and a data transmission interface 330. The core unit 320 is mainly utilized for executing the major function of the electronic device 310, which may include a central processing unit and a memory or further include other function module (e.g. a Bluetooth receiver). The data transmission interface 330 includes a receiving circuit 332, a driving circuit 334, a physical layer circuit 336 and a processing unit 338 (which may be a serial interface engine (SIE) in one exemplary embodiment). The physical layer circuit 336 includes a transmission error counting unit 3361, a control unit 3362, and a transmission counting unit 3363. The physical layer circuit 336 is utilized for observing the exactness of data transmission while the test data is sent, and then tuning the present current value of the driving current provided by the driving circuit 334 according to the method. In this exemplary embodiment, the driving apparatus comprises the driving circuit 334, the transmission error counting unit 3361 and the control unit 3362. The driving circuit 334 provides a driving current having a present current value to continuously send a test data from the data transmission interface 330 to a receiving end (namely the host device 340 in this exemplary embodiment). The transmission counting unit 3363 accumulates a number of times that the test data is sent in order to generate a transmission counting result. The control unit 3362 determines whether a transmission error occurs while the test data is sent to the host device 340. The transmission error counting unit 3361 accumulates a number of times that the transmission error occurs in accordance with the determination of the control unit 3362 to generate a transmission error counting result. When the transmission counting result reaches a predetermined value, the control unit 3362 starts to determine how to tune the present current value of the driving current provided by the driving circuit 334 in accordance with the transmission error counting result. As the operations and steps of tuning the driving current are already described above, they are omitted here for the sake of brevity.

The processing unit 338 controls the data transmission interface 330 to receive/transmit data that is received by or transmitted to the core unit 320. According to the direction of data transmission, the data may be received by the receiving circuit 332 or transmitted to the driving circuit 334. Further, the host device 340 sends request messages through the data transmission interface 341 to activate the driving current tuning mechanism. After the host device 340 receives the test data sent from the data transmission interface 340 through the data transmission interface 341, the host device 340 utilizes a core unit 342 to detect if the received test data has correctly been received. If an error is detected, which means that the transmission error occurs, the host device 340 sends the request message through the data transmission interface 341 to the electronic device 310 again in order to ask the electronic device 310 re-send the test data. Accordingly, the control unit 3362 repeatedly receives the request messages and therefore determines that the transmission error indeed occurs. Then, the control unit 3362 informs the transmission error counting unit 3361 to count so that the transmission error counting result will be updated.

When the host device 340 cannot correctly receive the test data sent from the data transmission interface in a certain proportion, it can be understood that the driving current provided by the driving circuit 334 of the driving apparatus is not sufficient to ensure the exactness and reliability of data transmission. Thus, the control unit 3362 in the driving apparatus will tune the present current value of the driving current provided by the driving circuit 334 according to the method. Once the present current value is tuned by the control unit 3362, the transmission counting unit 3363 and the transmission error counting unit 3361 will be reset in order for the physical layer circuit 336 to restart to observe whether the presently-tuned driving current is able to ensure the exactness of data transmission (or, whether the presently-tuned driving current needs to be tuned again). As the data transmission interface and driving apparatus is designed in accordance with the foregoing method, operations and implementations regarding components in the data transmission interface and driving apparatus can be understood from the foregoing paragraphs, and are omitted here for the sake of brevity.

Those skilled in the art will readily observe that numerous modifications and alterations of the device and method may be made while retaining the teachings of the disclosure.

What is claimed is:

1. A method of tuning a driving current of a data transmission interface, comprising:
utilizing a driving current having a present current value to continuously send a test data from the data transmission interface to a receiving end;
accumulating a number of times that the test data is sent to generate a transmission counting result;

determining whether a transmission error occurs while the test data is sent to the receiving end and accumulating, a number of times that the transmission error occurs to generate a transmission error counting result; and when the transmission counting result reaches a predetermined value, determining how to tune the present current value of the driving current according to the transmission error counting result, comprising:

comparing the transmission error counting result with a threshold value;

decreasing the present current value if the transmission error counting result is smaller than the threshold value; and increasing the present current value if the transmission error counting result is greater than the threshold value.

2. The method of claim 1, further comprising:
utilizing the driving current having the present current value that has been tuned to send a plurality of non-test data.

3. The method of claim 2, wherein each test data and each non-test data are packets.

4. The method of claim 1, wherein the step of utilizing the driving current having the present current value to continuously send the test data from the data transmission interface to the receiving end comprises:

each time the test data is sent from the data transmission interface to the receiving end, sending the test data according to a request message sent.

5. The method of claim 4, wherein the step of determining whether the transmission error occurs while the test data is sent to the receiving end comprises:

determining that the transmission error occurs while the test data is sent to the receiving end if the request message is received again immediately after the test data is sent to the receiving end according to the request message.

6. The method of claim 1, further comprising:
when the present current value of the driving current is decreased, resetting the transmission error counting result and transmission counting result, and repeatedly tuning the driving current of the data transmission interface;

wherein the step of increasing the present current value further comprises:
finishing tuning the driving current of the data transmission interface.

7. The method of claim 1, further comprising:
when the present current value of the driving current is increased, resetting the transmission error counting result and transmission counting result, and repeatedly tuning the driving current of the data transmission interface;

wherein the step of increasing the present current value further comprises:
finishing tuning the driving current of the data transmission interface.

8. The method of claim 1, wherein the data transmission interface is compliant with the specification of Universal Serial Bus (USB) standard.

9. A driving apparatus, comprising:
a driving circuit, for providing a driving current having a present current value in order to continuously send a test data from a data transmission interface to a receiving end;

a control unit, for determining whether a transmission error occurs while the test data is sent to the receiving end; and a transmission error counting unit, coupled to the control unit, for accumulating a number of times that the transmission error occurs to generate a transmission error counting result according to the determination of the control unit;

wherein when a transmission counting result corresponding to a number of times the test data is sent reaches a predetermined value, the control unit determines how to tune the present current value of the driving current according to the transmission error counting result;

wherein control unit compares the transmission error counting result with a threshold value; the control unit decreases the present current value if the transmission error counting result is smaller than the threshold value; and the control unit increases the present current value if the transmission error counting result is greater than the threshold value.

10. The driving apparatus of claim 9, the driving circuit further utilizes the driving current having the present current value that has been tuned to send a plurality of non-test data.

11. The driving apparatus of claim 10, wherein each test data and each non-test data are packets.

12. The driving apparatus of claim 9, wherein the test data is sent by the driving circuit from the data transmission interface to the receiving end according to a request message sent from the receiving end.

13. The driving apparatus of claim 12, wherein the control unit determines that the transmission error occurs while the test data is sent to the receiving end if the request message is received again immediately after the test data is sent to the receiving end according to the request message.

14. The driving apparatus of claim 9, wherein when the control unit decreases the present current value of the driving current, the control unit resets the transmission error counting result and transmission counting result, and repeatedly tunes the driving current of the data transmission interface; and when the control unit increases the present current value of the driving current, the control unit finishes tuning the driving current of the data transmission interface.

15. The driving apparatus of claim 9, wherein when the control unit increases the present current value of the driving current, the control unit resets the transmission error counting result and transmission counting result, and repeatedly tunes the driving current of the data transmission interface; and when the control unit decreases the present current value of the driving current, the control unit finishes tuning the driving current of the data transmission interface.

16. The driving apparatus of claim 9, wherein the data transmission interface is compliant with the specification of Universal Serial Bus (USB) standard.

* * * * *